(12) United States Patent
Shirk

(10) Patent No.: US 9,098,730 B2
(45) Date of Patent: Aug. 4, 2015

(54) SYSTEM AND METHOD FOR PRESERVING ELECTRONICALLY STORED INFORMATION

(75) Inventor: Eric S. Shirk, Spring, TX (US)

(73) Assignee: BDO USA, LLP, Chicago, IL (US)

( * ) Notice: Subject to any disclaimer, the term of this patent is extended or adjusted under 35 U.S.C. 154(b) by 652 days.

(21) Appl. No.: 12/695,658

(22) Filed: Jan. 28, 2010

(65) Prior Publication Data

US 2011/0184919 A1    Jul. 28, 2011

(51) Int. Cl.
  G06F 11/00    (2006.01)
  G06F 21/87    (2013.01)
  G06F 21/30    (2013.01)
  H04L 29/08    (2006.01)

(52) U.S. Cl.
  CPC .............. *G06F 21/87* (2013.01); *G06F 21/305* (2013.01); *H04L 67/34* (2013.01)

(58) Field of Classification Search
  CPC ........ G06F 21/87; G06F 21/305; H04L 67/34
  See application file for complete search history.

(56) References Cited

U.S. PATENT DOCUMENTS

| | | | |
|---|---|---|---|
| 6,292,795 B1 * | 9/2001 | Peters et al. | 1/1 |
| 7,756,841 B2 * | 7/2010 | Probert et al. | 707/690 |
| 7,779,032 B1 * | 8/2010 | Garfinkel | 707/776 |
| 7,814,077 B2 * | 10/2010 | Nguyen et al. | 707/695 |
| 8,239,706 B1 * | 8/2012 | Yang | 714/6.24 |
| 8,516,480 B1 * | 8/2013 | Epstein et al. | 718/1 |
| 2003/0037202 A1 * | 2/2003 | Kedem et al. | 711/100 |
| 2003/0066062 A1 * | 4/2003 | Brannock et al. | 717/169 |
| 2005/0091556 A1 * | 4/2005 | Frolund et al. | 714/2 |
| 2005/0198051 A1 * | 9/2005 | Marr et al. | 707/100 |
| 2006/0259790 A1 * | 11/2006 | Asokan et al. | 713/194 |
| 2007/0025713 A1 * | 2/2007 | Hosono | 396/72 |
| 2007/0073792 A1 * | 3/2007 | Nichols et al. | 707/205 |
| 2007/0143749 A1 * | 6/2007 | Date et al. | 717/172 |
| 2007/0280515 A1 * | 12/2007 | Goto | 382/124 |
| 2009/0129227 A1 * | 5/2009 | Tai | 369/53.35 |

(Continued)

OTHER PUBLICATIONS

W. Jansen, R. Ayers "An overview and analysis of PDA forensic tools", Digital Investigation (2005), pp. 120-132.*

(Continued)

*Primary Examiner* — Polina Peach
(74) *Attorney, Agent, or Firm* — Katten Muchin Rosenman LLP

(57) ABSTRACT

A system and method for collection of electronically stored information (ESI) from Windows based desktops and laptops is disclosed that are under the control of remote custodians. The system and method include an external persistent memory storage device and a software application tool that is loaded onto the persistent memory storage device. The external persistent memory storage device is connected to the computer system hosting the persistent memory storage device to be examined, for example, by way of a USB or Ethernet port. Once connected to the computer system hosting the persistent memory storage device to be examined, a Quick Start program, which, when opened, allows the required processing to be methodically performed. Documentation is provided for completing information regarding the chain of custody of the external persistent memory storage device. The documentation may be imprinted on a security receptacle for receiving the external persistent memory storage device. The security receptacle is configured to protect the persistent memory storage device from electrostatic discharge and to indicate if the bag or container was tampered with after it was sealed.

11 Claims, 11 Drawing Sheets

(56) References Cited

U.S. PATENT DOCUMENTS

| | | | |
|---|---|---|---|
| 2009/0138527 A1* | 5/2009 | Honda et al. | 707/202 |
| 2009/0164427 A1* | 6/2009 | Shields et al. | 707/3 |
| 2009/0187763 A1* | 7/2009 | Freericks et al. | 713/167 |
| 2010/0177487 A1* | 7/2010 | Arshad et al. | 361/737 |
| 2014/0372393 A1* | 12/2014 | Gosnell | 707/698 |

OTHER PUBLICATIONS

Strunk et al. "Self-Securing Storage: Protecting Data in Compromised Systems", 2000 ACM.*

FTK Imager, manufactured by Access Data Corporation (http://www.accessdata.com/forensictoolkit.html).

Encase, manufactured by Guidance Software, Inc. (http://www.guidancesoftware.com/).

Alert Security Bags by Packaging Horizons Corporation, (www.SecurityBag.com).

AccessData Corp. (http://www.accessdata.com/overview.html).

Forensicon Compute Forensic Specialist What is forensic Hard Drive Imaging?

eDiscovery "Tristan Self Collection Kit."

eDiscovery Data Acquisition & Evaluation Services.

eDiscovery "Data Security & Chain of Custody."

Searn Doherty, Law.com, LTN Law Technology News "Collect Evidence with EnCase Portable" Dec. 3, 2009.

Maintaining the Chain of Custody in Civiil Litigation, Merrill Legal Solutions.

Computer forensics, FTK Imager.

User Guide "Forensic Toolkit Imager" AccessData.

* cited by examiner

Data Self Collection QuickStart - execute each link to finalize the collection

| Step | Description | Link |
|---|---|---|
| 1 - Introduction | Brief overview of the process | Overview |
| 2 - Step-by-Step Guide | Written guide | Guide |
| 3. Step-by-Step Video | Video guide | Video |
| 4 - Audit | Logging of your computer's components | Audit |
| 5 - Collection | Create image of your data | FTK |
| 6 - Chain of Custody | Complete a form | COC |
| 7 - Quality Check | Review our work | QC |
| 8 - Shipment | Return hard drive to UHY Advisors | Return |

*Fig. 4*

Remove this Receipt Before Attempting to Seal Bag. Retain for Records.

FOLD HERE — — — — — — — — — — — — — — — — — — FOLD HERE
CAUTION: ATTEMPTS TO REOPEN WILL INDICATE TAMPERING

ALERT ➤ SECURITY BAG™

029213791

EVIDENCE

Station/Section/Unit/Dept _____
Case Number _____ Item# _____
Type of Offense _____
Description of Evidence _____
_____
_____
Suspect _____
Victim _____
Date and Time of Recovery _____
Location of Recovery _____
Recovered By _____

CHAIN OF CUSTODY

Received From _____ By _____
Date _____ Time _____ AM /PM
Received From _____ By _____
Date _____ Time _____ AM /PM
Received From _____ By _____
Date _____ Time _____ AM /PM
Received From _____ By _____
Date _____ Time _____ AM /PM Warning: THIS IS A TAMPER EVIDENT SECURITY PACKAGE. ONCE SEALED, ANY ATTEMPT TO OPEN WILL RESULT IN OBVIOUS SIGNS OF TAMPERING.

45

*Fig. 5* eDiscovery & Digital Forensics
Self Collection Kit

Enclosed is your Self Collection Kit. Please plug in the supplied USB hard drive and open the QuickStart.xls file located at the root of the drive.

Questions: Please do not hesitate to email us at scsupport@uhy-us.com if you should have any question about the collection process.

Thank you,

*Fig. 6*

*Example*

Computer Information – please complete all sections

| Date of Collection: | 10/03/2008 |
|---|---|
| Primary User: | John Doe |
| Person Collecting Data: | John Doe |
| Make: | Dell |
| Model: | D820 |
| Serial Number: | XTCD5844 |
| Data Partitions Collected: | C: and D: |

Chain of Custody

Date: 10/04/2008   Engagement: Acme Manufactoring Inc.

| Item | Description | | | |
|---|---|---|---|---|
| A | UHY Self Collection Kit – UHY50100 | | | |
| Item | Date / Time | Released By | Received By | Purpose |
| A | 10/04/2008 9:35a.m. | John Doe | FedEx Tracking Nbr: 3943-9726-1294-3894 | Return Device to UHY |
| | | | | |

*Fig. 9*

SYSTEM AND METHOD FOR PRESERVING ELECTRONICALLY STORED INFORMATION

COMPUTER APPENDIX

This application includes a Computer Listing Appendix, attached as an Appendix hereto.

BACKGROUND OF THE INVENTION

1. Field of the Invention

The present invention relates to a system and method for preserving user created electronically stored information (ESI) and more particularly to a system and method for preserving (ESI) that complies with the Federal Rules of Civil Procedure with respect to discovery of such ESI.

2. Description of the Prior Art

In December of 2006, various amendments to the Federal Rules of Civil Procedure became effective dealing with discovery of such electronically stored information. Specifically, various Rules including Rules 26(a)(1), 33, and 34 were amended to include the phrase "electronically stored information". Under the amended Rule 34 (a), the electronically stored information may include "writings, drawings, graphs, charts, photographs, sound recordings, images, and other data or data compilations—stored in any medium from which information can be obtained either directly or, if necessary, after translation by the responding party into a reasonably usable form". The definition is broad enough to cover future technology.

Such electronically stored information provides more information than paper copies of the documents. Specifically, electronically stored information includes the actual data or file and also includes meta data. Meta data relates to information about the file itself. For example, such meta data is known to include the name of the creator of the document, the date the file was last revised and any related file information related to the document. The Meta data is stored along with the file on an electronic storage device, such as a hard drive or other persistent memory storage device.

The storage of documents on a hard drive in most computer systems is tracked by way of a File Allocation Table or FAT. More specifically, whenever data is written to the hard drive, the operating system uses the FAT to select an available storage location on the hard drive to store the data. The operating system also uses the FAT to keep track of those storage locations. When files are deleted, the documents are not physically erased from the hard drive. Rather, the entries relating to that file are simply deleted from the FAT. The file remains on the hard drive until it is written over by another file. Thus, even after a file has been deleted by a user, an image of the file will often be available for a fairly long time afterward.

In response to the relatively new rules regarding the discovery of electronically stored information, computer forensic experts are known to be used to extract or harvest images of all of the files on all of a company's persistent memory storage devices including deleted files, spaces and Internet surfing histories. These persistent memory storage devices are known to be located on servers and personal computers including desk top computers and lap top computers.

Harvesting of an image on a persistent memory storage device includes creating an image of all active files on the hard drive or other persistent memory storage device as well as deleted files. This process involves making a bit by bit copy of all of the data on the persistent memory storage device being examined. More specifically, software tools are known, such as FTK Imager, manufactured by Access Data Corporation (http://www.accessdata.com/forensictoolkit.html) and Encase, manufactured by Guidance Software, Inc. (http://www.guidancesoftware.com/), are known to be used to copy data from a hard drive, electronic memory storage device or other persistent memory device (hereinafter "persistent memory storage device") without altering any of the user created data or the meta data relating to the user created data on the target persistent memory storage device being examined.

Once an image of target persistent memory storage device is completed, the data is analyzed by such known software tools to determine an electronic fingerprint or hash value of the target persistent memory storage device being examined. Determining a hash value involves examining all of the 1's and 0's stored on the target persistent memory storage device being examined. The hash value allows any data changes from the target persistent memory storage device being examined to the external persistent memory storage device to be easily detected. More specifically, any change of the data from the target persistent memory storage device being examined, even a single bit, from the target persistent memory storage device to the external persistent memory storage device will result in a totally different hash value. After the image transfer process is complete, the hash values of the target persistent memory storage device and the external persistent memory storage device should be exactly the same. Matching hash values lend support to the authenticity of the data copied from the target persistent memory storage device being examined.

In some cases, due to the volume of files contained in an image of the persistent memory storage device, the computer forensic experts are known to search the image file for specific files suggested by the opposing party and provide condensed versions of the persistent memory storage device image. In such cases, hash values of the copied files are determined and used to determine the authenticity of the copied files.

The amended Federal Rules of Civil Procedure require the preservation and disclosure of electronically stored information to the requesting party. As such, harvested data from the target persistent memory storage devices of the various servers and personal computers involved are known to be stored on a pristine external persistent memory storage devices for production to the opposing party in the litigation Federal Rule of Evidence 901 (a) requires that evidence must be properly authenticated before being admitted in Court. As such, in order for the electronically stored information to be admissible in court, proof of the chain of custody of the harvested electronically stored information must be provided to the satisfaction of a Court before it will be admitted into evidence in a case. This proof normally includes documenting the methodology used in the forensic acquisition of the electronically stored information contained on the target persistent memory storage device, and providing proof of the chain of custody of the electronically stored information during and after the retrieval process.

In most situations, the various servers and personal computers that need to be imaged are located in a central location. Thus, the time and therefore the cost for computer forensic experts is mostly spent on imaging and processing the persistent memory storage devices in the central location. In many cases, one or more target persistent memory storage devices are located at locations remote from the central location. In such situations, additional costs are incurred for travel expenses and travel time which significantly increases the cost of responding to a production request for electronically stored information. Thus, there is a need for reducing the cost with respect to such remote target persistent memory storage devices at remote locations.

SUMMARY OF THE INVENTION

The present invention relates to a system and method for collection of electronically stored information (ESI) from Windows based desktops, laptops and servers ("computer system") that are under the control of remote custodians. The system and method in accordance with the present invention includes an external persistent memory storage device and a software application tool that is loaded onto random access memory (RAM) of the target computer system to be examined and executed by the target computer system from its RAM memory. The external persistent memory storage device is connected to the computer system hosting the target persistent memory storage device, for example, by way of a USB or Ethernet port. Once connected to the computer system hosting the target persistent memory storage device to be examined, a Quick Start program, which, when opened, allows the required processing to be methodically performed. In order to preserve the evidentiary value of the image recorded on the external persistent memory storage device, documentation is provided, which, when completed, contains a log of the chain of custody of the external persistent memory storage device, which can be used to provide a foundation in order to admit the data and/or metadata into evidence in a legal proceeding. The documentation may be imprinted on a security receptacle for receiving the external persistent memory storage device. The security receptacle may be further configured to protect the persistent memory storage device from electrostatic discharge and to indicate if the bag or container was tampered with after it was sealed.

DESCRIPTION OF THE DRAWING

These and other advantages of the present invention will be readily understood with reference to the following specification and attached drawing wherein:

FIG. 4 is an exemplary screen shot of the various exemplary steps in the process of recovering an image of a remotely located persistent memory storage device.

FIG. 5 illustrates exemplary list of information required to provide a legal foundation for the electronically stored information collected in accordance with the present invention.

FIG. 6 is an exemplary set of instructions provided with an evidence kit in accordance with the present invention.

DETAILED DESCRIPTION

Figure 1A:
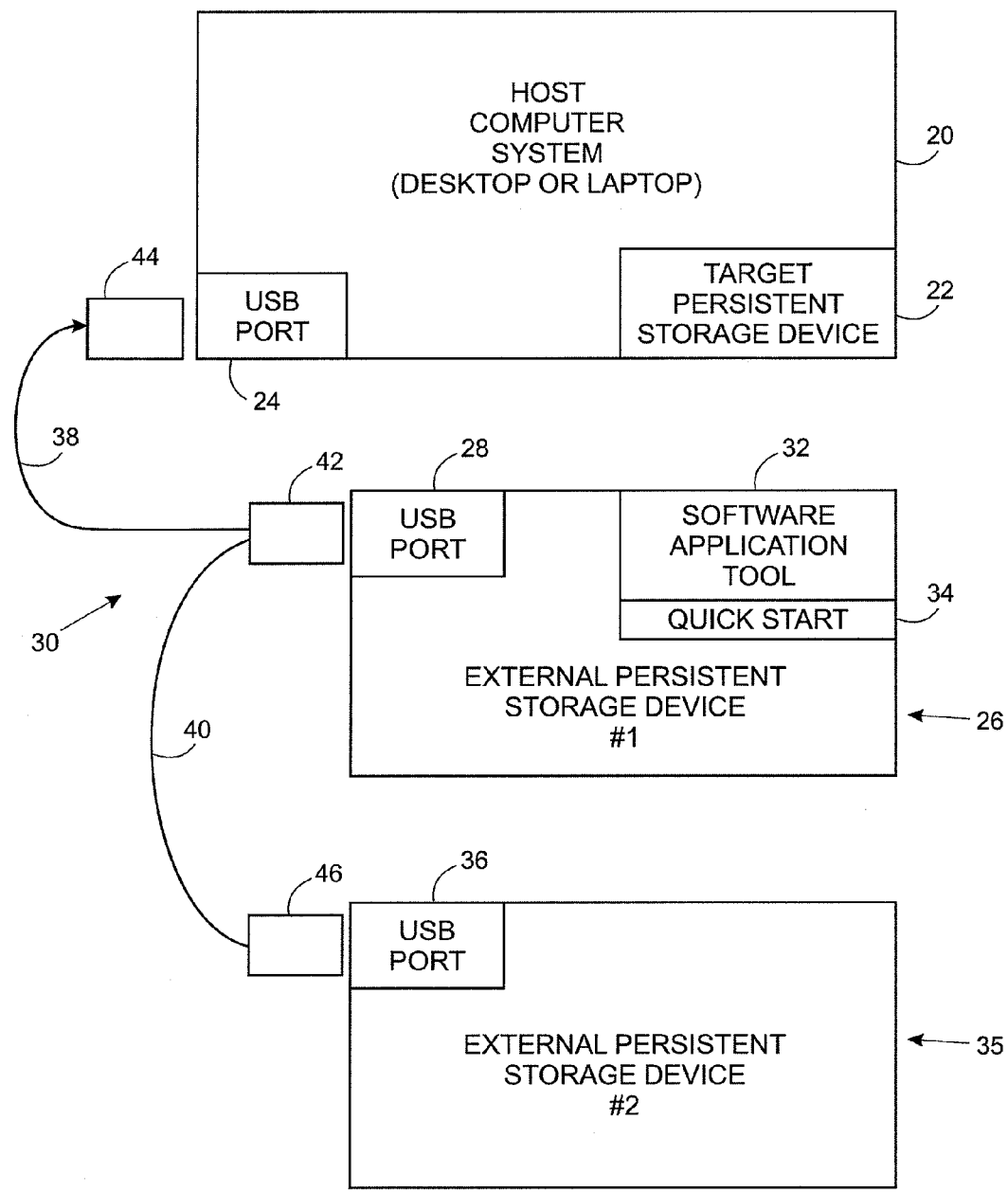
FIG. 1A is a simplified hardware block diagram of the system in accordance an embodiment of the present invention for use with desktop and laptop computer systems.

The present invention relates to a system and method for collection of user created electronically stored information (ESI) from Windows based desktops, laptops and servers that are under the control of remote custodians. The system and method includes an external persistent memory storage device and a software application tool. The software application tool is loaded into random access memory (RAM) of the target computer system to be examined and executed by the target computer system from its RAM memory. For desk top and lap top computer systems, the external persistent memory storage device, for example, a hard drive, that is connected to the computer system hosting the target persistent memory storage device for example, by way of a USB port. In such applications, the software application tool may be pre-loaded on the hard drive. For server applications, the external persistent memory storage device may consist of an external flash drive is connected to a USB port of the server hosting the target persistent memory storage device to be examined. In this application, the external persistent memory storage device is connected to the server hosting the target persistent memory storage device, for example, by way of a Ethernet port or alternatively a USB port.

Once connected to the computer system hosting the target persistent memory storage device to be examined, the software application tool is loaded into RAM memory of the target computer system. More particularly, the software application tool includes a start program, which, when opened, allows the required processing to be methodically performed. In particular, once started, all of the steps involved in the process are mapped out to facilitate the process including downloading an image of the target persistent memory storage device or other storage space ("source file") to be examined onto the external persistent memory storage device. The source file is completely copied including spaces and deleted files without changing any data created by the user or meta data relating to the user created data onto the external persistent memory storage device, thereby creating an exact image of the source file.

Before any processing is done, the software application tool determines the electronic fingerprint or hash value of the source file and compares it with the hash value of the image file on the external persistent memory storage device. If the hash values are the same, the image file on the external persistent memory storage device is determined to be an exact copy of the source file.

As is discussed in more detail below, in order to facilitate the ability to present a legal evidentiary foundation in a case in a Court of law in order to admit the image file, into evidence, a document is provided which lists information to be completed by the individual recovering the source file, which includes a log of the chain of custody of the external persistent memory storage device 26, 34 The documentation may be imprinted on a security bag or container used to transport the external persistent memory storage device.

The security bag or container (hereinafter "security receptacle") is sealed after the external persistent memory storage device is placed in it. The security receptacle is configured to protect the external persistent memory storage device from electrostatic discharge and to indicate if the bag or container was tampered with after it was sealed. The system and method thus allows images of remotely located target persistent memory storage devices to be made easily and without the aid of computer forensic experts while preserving the authenticity of the data collected.

Referring to FIG. 1A, a hardware block diagram is illustrated for an exemplary computer system consisting of a laptop or desktop computer. As shown, the system is connected to a host computer system 20 which includes an internal persistent memory storage device 22 to be examined and a USB or Ethernet port 24, for example. The system in accordance with the present invention includes an external persistent memory storage device 26 which includes a USB port 28, for example. The system may also include a USB cable, generally identified with the reference numeral 30.

As will be discussed in more detail below, a software application tool 32 is loaded on the external persistent memory storage device 26 which includes a Quick Start program 34 which facilitates methodical execution of the steps involved in the process. In an exemplary embodiment of the invention, the software application tool is compatible with Windows 2000, XP, Vista Server 2003 and Server 2008 operating systems.

In accordance with an optional embodiment of the invention, two (2) external persistent memory storage devices may be daisy chained together as shown in FIG. 1A. More particularly, a second external persistent memory storage device, generally identified with the reference numeral 32 can be connected to the external persistent memory storage device 26 to provide additional capacity, depending on the size of the internal persistent memory storage device 22 to be imaged. In this mode of operation, the second persistent memory storage device 34, which may be identical to the persistent memory storage device 26, is connected in parallel to a the first external persistent memory storage device by way of a USB port 36, to therefore double the capacity of the system.

Since the external persistent memory storage devices are to be sent by mail or transported by courier, external persistent memory storage devices with relatively small form factors, for example, hard drives with 2.5 inch platters, represent a good option. For example, a 2.5 inch SATA mobile hard disk drive may be used. Such hard drives are known to be available with up to a 640 gigabyte capacity are available. The size of the hard drive or other persistent memory storage device is selected to be commensurate with the sizes of the target persistent memory storage devices to be imaged that are normally available on Windows based computers. Accordingly, a hard drive may be selected from 160 gigabytes to 500 gigabytes of storage capacity taking into account the size of the software application tool; the File Allocation Table and the disk operating system. Other exemplary characteristics of the external hard drive or other persistent memory storage device 26, 34 is a USB port 28, 36 and the ability to be powered from the host computer system 20

In the exemplary embodiment of the invention for computer systems consisting of desktops and laptops, as illustrated in FIG. 1A, the external persistent memory storage device 26 is connected to the host computer system 20, i.e. desktop or laptop computer, with a standard USB cable 38 with standard USB connectors at each end 42,44 connected to USB ports 24 and 28 on the host computer system 20 and the external persistent memory storage device 26, respectively.

In an optional embodiment, a modified USB cable may be provided, as shown in FIG. 1A which allows two (2) external persistent memory storage devices 26, 34 to be daisy chained, i.e. connected in parallel, and, in turn, connected to a USB port 24 on the host computer system 20. In this embodiment, the USB cable 30 is comprised of two (2) standard USB cables 38 and 40 and three (3) standard USB connectors 42, 44 and 46 One end of the cables 38 and 40 is tied together, i.e parallel, and connected to the connector 42, which, in turn, is configured to be connected to the USB port 28 on the external persistent memory storage device 26. The other end of the cable 40 is connected to the USB connector 46, which, in turn, is configured to be connected to the USB port 36 on the external persistent memory storage device 34. The other end of the cable 38 is connected to the USB connector 44, which, in turn, is configured to be connected to the USB port 24 on the host computer system 20.

Figure 1B:
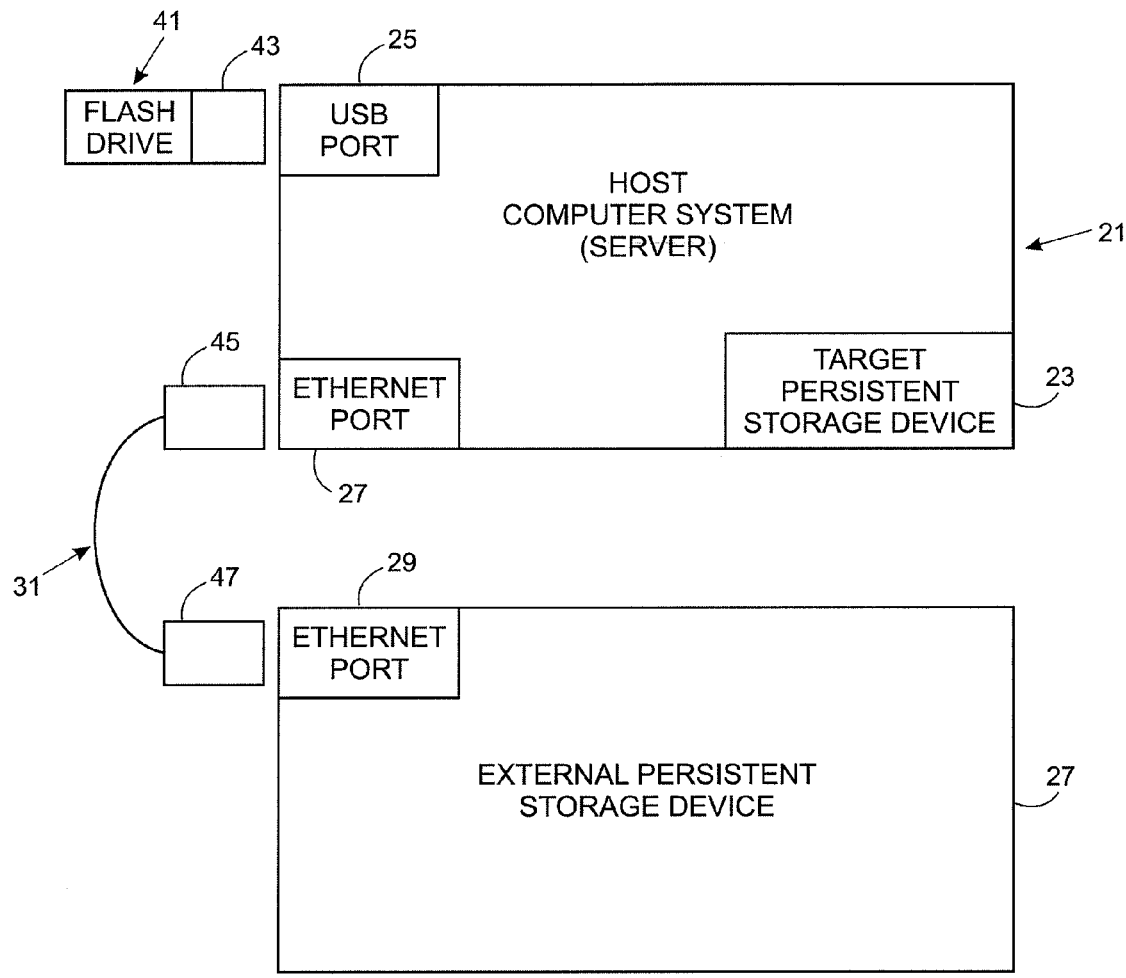
FIG. 1B is a simplified hardware block diagram of the system in accordance an embodiment of the present invention for use with servers.

In an alternative embodiment, the system and method can be used in applications where the target persistent storage device 23 is stored on a server 21, as generally illustrated in FIG. 1B. This embodiment includes an external persistent storage device 27, a flash drive 41 and a cable 31. In this embodiment, the external persistent storage device 27 is connected to the server 21 by way of an Ethernet cable 31 that includes Ethernet connectors 45, 47 on each end. The Ethernet connectors 45, 47 are connected to Ethernet ports 27 and 29 on the server 21 and the external persistent storage device 27, respectively. In this embodiment, the external persistent storage device is powered from an external source other than the server 21.

As discussed above, various information must be supplied to support the authenticity of the image file. As such, chain of custody information, for example, as illustrated in FIG. 5, may be imprinted on a security bag, generally identified with the reference numeral 45. The security bag 45 is used for receiving the external persistent memory storage device 26. Once the image file of the source file is created and its authenticity verified, the external persistent memory storage device 26 is placed in the security bag 45 and sealed. The security bag 45 and contents are then mailed or sent by courier from the location of the remote custodian to the computer forensic experts.

The security bag 45 provides three functions. First, the security bag 45 shields the external persistent memory storage device 26, 34 from electrostatic discharge. (ESD). Second, the security bag 45 is a tamper evident security package and, once sealed, will indicate any attempts to open the bag. Third, the security bag 45 lists information to be completed to support a proper legal foundation of the image file on the external persistent memory storage device 26, 34. For example, the information may include: a unique ID number, a description of the evidence; date and time of recovery of the image file on the external persistent memory storage device 26,34. location of the source file and identity of the person who recovered the source file and information regarding the chain of custody of the security bag 45 and its contents. An exemplary security bag 45 may be obtained by Packaging Horizons Corporation (www.SecurityBag.com), stock number 68 AEC.

Software Application Tool

The software application tool 32 is loaded on the external persistent memory storage device 26, 34 or external flash drive 41. Once the external persistent memory storage device 26, 27, 35 is connected to the host computer system 20, 21, the software application tool 32 can be accessed by selecting "Computer" on the start-up menu on the host computer system 20, 21. As will be discussed in more detail below, the software application tool 32 includes a disk imaging tool. Various disk imaging tools are suitable for use with the present invention. An exemplary disk imaging tool for use with the present invention is available from AccessData Corp. (http://www.accessdata.com/overview.html). Other disk imaging tools are suitable for use with the present invention. An important aspect of the disk imaging tool is that none of the original data created by the user or metadata related to the user created data is changed by the imaging process. The disk imaging tool is used to accomplish the following functions:

Capture an image on a physical drive or a logical drive.
View imaged files
Generate hash values for imaged files.
Export selected imaged files.

Figure 2:
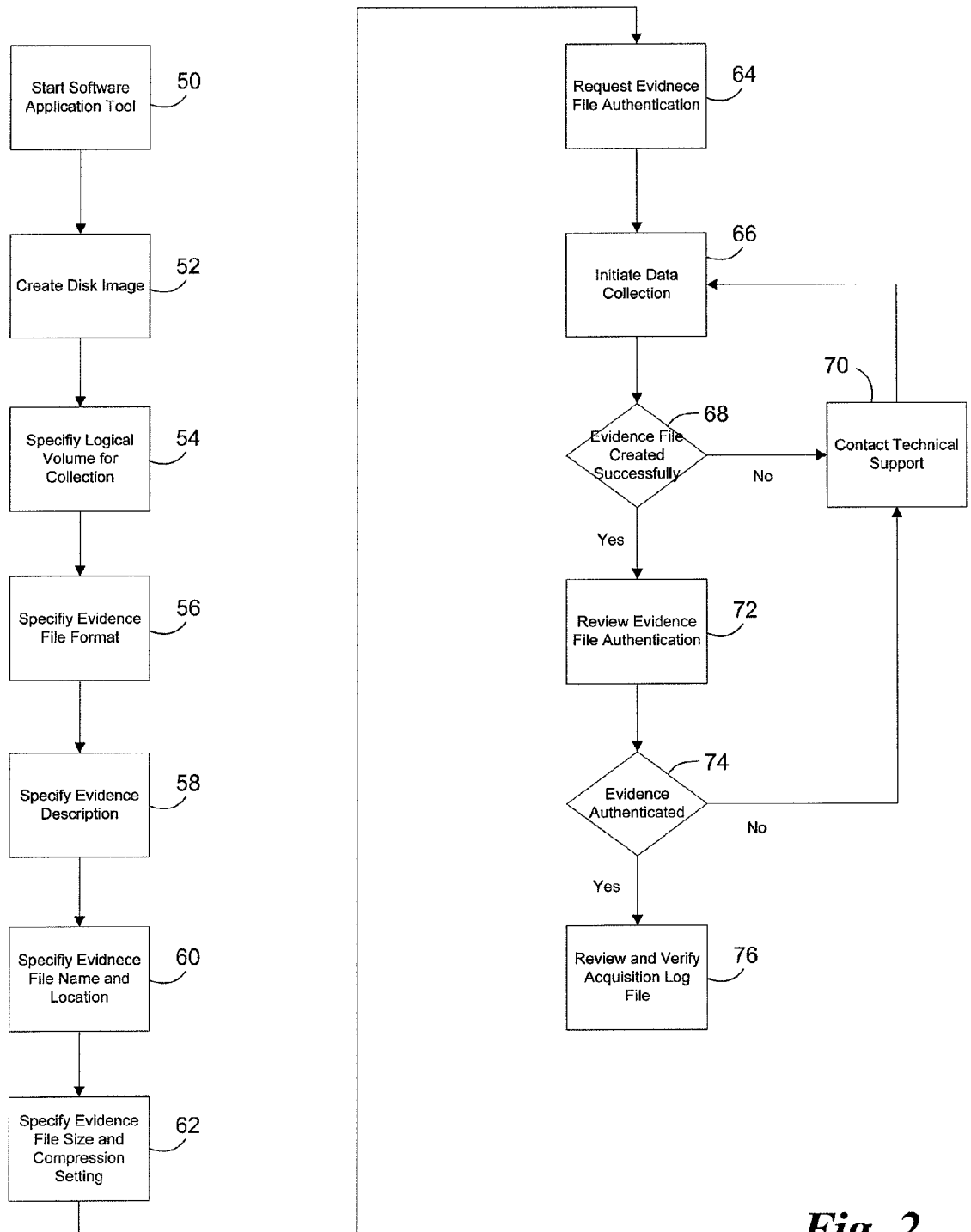
FIG. 2 is a software flow diagram of the process for automatically creating an image of a target persistent memory storage device to be examined in accordance with the present invention.

Referring to FIG. 2, an exemplary software flow diagram illustrates the process of imaging and authenticating the image of the image of the target persistent memory storage device being examined. Initially, in step 50, the disk imaging tool is started in step 50. In step 52, the process of creating a disk image is initiated. Specifically, a "Create Disk image" option is selected from a drop down menu. After the "Create Disk Image" option is selected, the system prompts the user in step 54 to select the source for the data collection. For example, the user may select a physical drive, a logical drive, image file, the contents of a folder or a device, such as a CD or DVD. Next in step 56, the user is prompted to select the evidence file format, such as "Raw", "Smart" or "E01". The Smart and E01 formats can be used compressed formats while the Raw format is only for uncompressed formats.

In step 58, the evidence description is entered into a dialog box. The evidence description is the name of the custodian of the file to be imaged. In step 60, the file name of the image file is entered to be the same name as entered in step 58. The user is next prompted in step 60 to identify the destination of the image file. In this case, the destination will be the external persistent memory storage device 26, 27 35. In step 62, the image fragment size and the compression setting are entered. The image fragment size relates to the maximum size in megabytes for each fragment of the image file. Subsequently in step 64, the user is requested to indicate whether the image file is to be authenticated. Next in step 66, the disk imaging tool creates an image of the internal persistent memory storage device 22,23 or other source, identified above in step 54 ("source file"). As mentioned above, the image is created without changing any user created data or associated metadata stored on the source file. The system thus checks in step 68 whether the image file has been successfully created. During the imaging process, the system may optionally display the status of that process. If the imaging process fails, the previous fragments are removed and the process is repeated. In that situation, the system control returns back to step 66 to repeat the process of creating an image file. The technical support for the system may optionally be contacted in step 70.

If the image file is successfully created, the system initiates authentification of the image file in step 72. As mentioned above, the authenticity of the image may be determined by determining the hash value of the data stored on the source file and comparing it with the hash value of the image file stored on the external persistent memory storage device 26. Other methods may also be used. If the hash values of the source file and the image file are the same, the image file is an exact copy of the source file. If even one bit of the data or metadata on the source has been changed, the hash values of the image file will be different from the hash value of the source file.

The system next determines in step 74 whether the image file is authenticated, for example, in the manner discussed above. If the image file is not authenticated, the user may be prompted to return to step 66 to remove previous fragments and re-initiate imaging of the source file. The technical support for the system may optionally be contacted in step 70

If the system determines authenticates the image file as being an exact copy of the source file, the system will display that the image file has been authenticated and verify the acquisition of the source file on the external persistent memory storage device 26,27,35 in step 76.

Evidence Kit

The system in accordance with the present invention may be provided as a kit that can be mailed to custodians for their use in recovering electronically stored information in the form of data and metadata from remote stored source files. The kit includes an external drive 26, 27, 35 with the software application tool 32 (FIG. 1), a security bag 45 (FIG. 5) and an exemplary set of instructions 78 (FIG. 6). As will be discussed in more detail below, the forensic recovery of electronically stored information of remotely located source files by custodians who are not computer forensic experts is a multi-step process.

Process

Figure 3A:
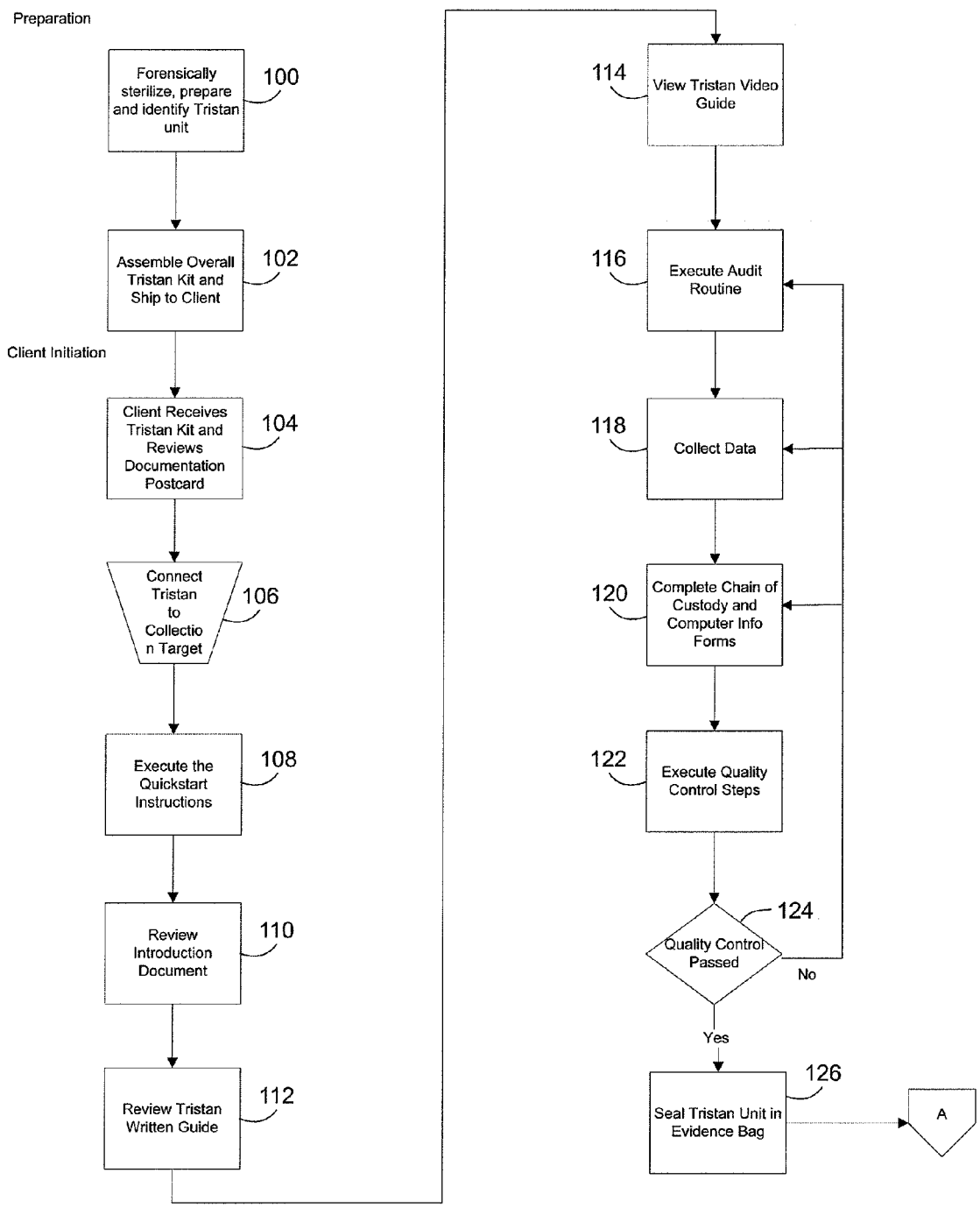
FIGS. 3A and 3B are process diagrams illustrating an exemplary process of recovering an image of a remotely located target persistent memory storage device.
Figure 3B:
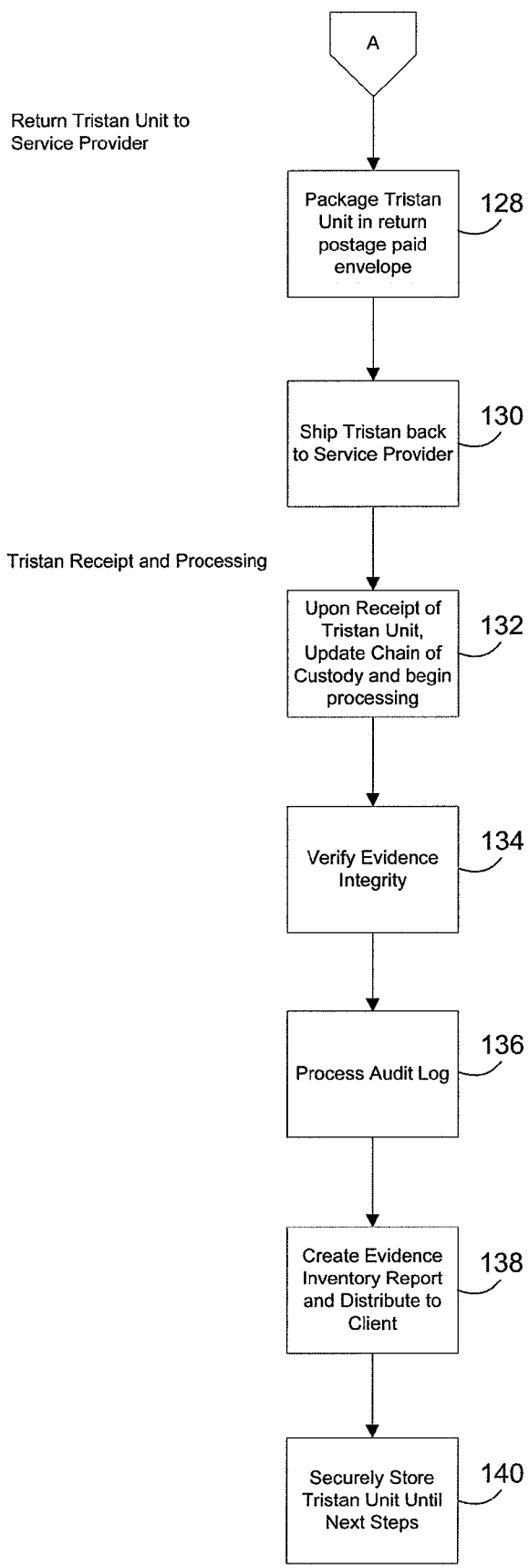
Figure 7:
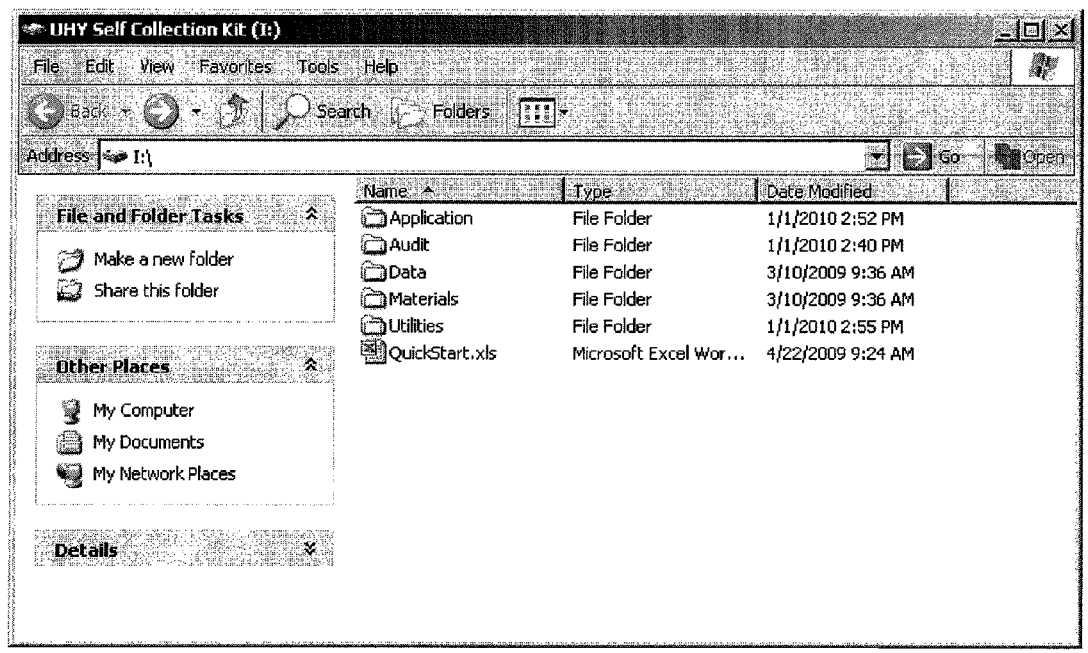
FIG. 7 is an exemplary screen shot illustrating an exemplary directory for the software application tool in accordance with the present invention.

FIGS. 3A and 3B illustrate the steps in the entire process of evidence collection and authentification of remote source files. In accordance with an important aspect of the invention, collection of electronically stored information by individuals who are not computer forensic experts can be done easily and quickly. Initially, in step 100, in response to a discovery request for electronically stored information, one or more external persistent memory storage devices 26, 27, 35 are forensically sterilized, for example by formatting the persistent memory storage devices. Next in step 102, the various components of the evidence kit described above are assembled and shipped to the client or directly to the custodian of the remotely located source files. In step 104, the client or custodian receives the evidence kit and reviews the exemplary set of instructions 78 (FIG. 6) included with the evidence kit. As mentioned above, the evidence kit includes an external persistent memory storage device 26, 27, 35 with a software application tool (FIG. 1) loaded thereupon. In step 106, the custodian or other user (hereinafter "collector") connects the external persistent memory storage device 26, 34 to the host computer system 20, 21, as discussed above. Once the external persistent memory storage device 26, 27, 35 is connected to the host computer system 20, 21 a directory of the files on the external persistent memory storage device 26, 27, 35 is illustrated, for example as shown in FIG. 7. In accordance with the instructions 78 (FIG. 6), the user selects the QuickStart file on the directory illustrated in FIG. 7. Once the QuickStart file is selected, an exemplary set of steps are displayed in step 108, as illustrated in FIG. 4, to provide user with step-by-step guidance for recovering a source data and returning an authenticated image of the source data back to the computer forensic experts for use as evidence in a legal proceeding. With reference to FIG. 4, steps 1-3 are instructional steps for providing the collector with a step-by-step guide. Thus, in steps 110, 112 and 114 (FIG. 3A), the collector is encouraged to review the instructional information provided by way of: A Brief Overview of the Process; A Written Guide and a Video Guide, respectively.

Next in step 116, the collector audits the host computer system 20, 21 and lists the information on an exemplary form, for example, as illustrated in FIG. 9. The form illustrated in FIG. 9 may also be used for Chain of Custody information. The audit step may include a software application that polls the target computer system and stores these details in a file. For example, see file enum_drives.txt in the Computer Appendix, as an example. This auditing step may be used for quality control purposes once the evidence files are returned us to determine if the collector has mistakenly/purposely not collected all partitions of the target persistent memory storage device.

Figure 8:
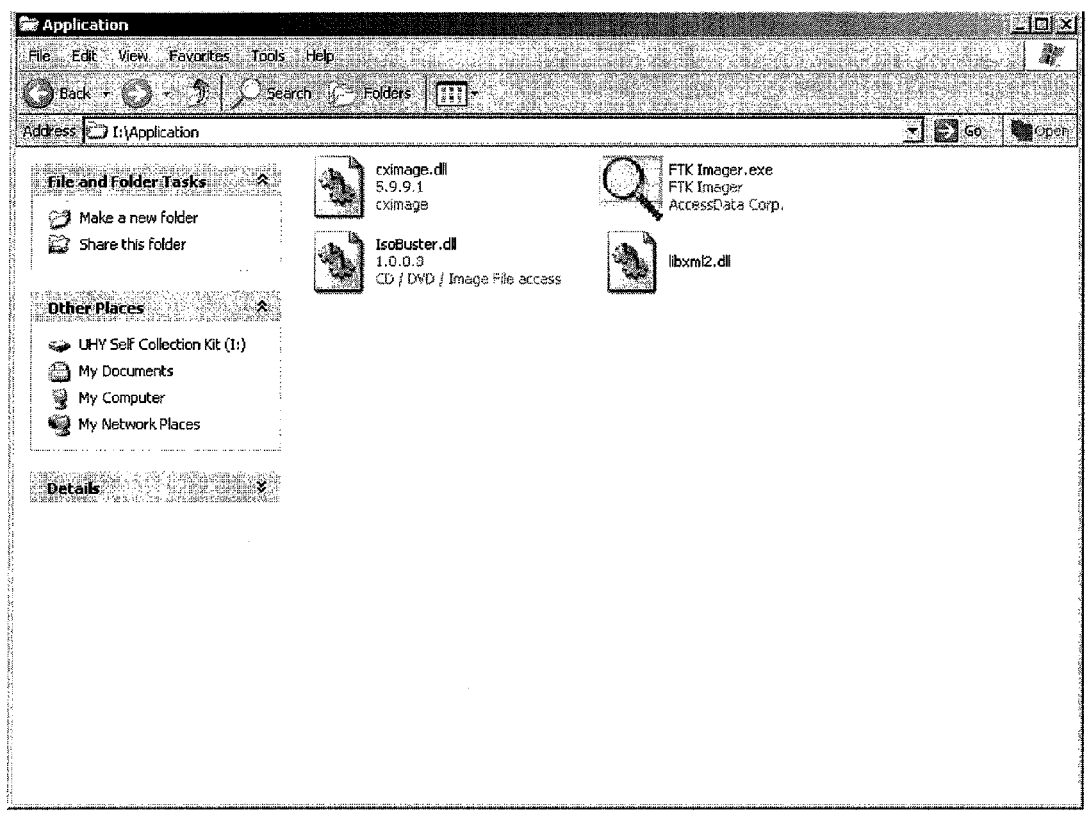
FIG. 8 is an exemplary screen shot illustrating an exemplary sub-directory for the software application tool in accordance with the present invention.

Next in step 118, the collector initiates imaging of the source file, as discussed above. For example, the collector can select an FTK link on the QuickStart menu illustrated in FIG. 4. Alternatively, the collector can select the Application File Folder on the directory of the external persistent memory storage device 26, 27, 35, illustrated in FIG. 7. Once the Application file folder, an exemplary sub-directory for the Application File Folder will be illustrated, for example, as illustrated in FIG. 8. Selection of the file "FTK Imager" will initiate the imaging of a source file as discussed above.

After the image of the source file is completed, the collector completes the chain of custody and information from the audit step discussed above in step 120 on the Form illustrated in FIG. 9 and on the security bag 45. In step 122, the collector may optionally execute a quality control check by reviewing the directory of the external persistent memory storage device 26, 27, 35 to make sure that the properly identified image file is present and making sure that the information on the security bag 45 is properly filled out. Any step(s) that do not pass the quality control check are repeated. If the quality control checks pass, as indicated by step 124, the external persistent memory storage device 26, 27, 35 is sealed in the security bag 45 (FIG. 5) in step 126. In step 128, the security bag 45 with the external persistent memory storage device with an image of the source file is packaged and shipped back to the computer forensic experts in steps 128 and 130. Upon receipt of the security bag 45 by the computer forensic experts, the chain of custody of the external persistent memory storage device 26, 34 is updated on the security bag 45, as indicated by step 132. In step 134, the external persistent memory storage device 26, 27, 35 is removed from the security bag 45 and examined for integrity, for example, using an MD5 hash. The security bag 45 is maintained as supporting documentation for the chain of custody. In step 136, the audit log of the various storage devices is reviewed for inconsistencies with other information regarding remotely stored image files. In addition, the audit file that is created from the Audit step on the Quickstart document is reviewed. This audit step documents the physical characteristics of the target computer and serves as a quality control (QC) step to determine if the collector has mistakenly/purposely not collected all partitions of the target persistent storage devices 22, 23 on the target computer systems 20, 21. The source file is inventoried in step 138 and securely stored in step 140 for further processing.

Obviously, many modifications and variations of the present invention are possible in light of the above teachings. Thus, it is to be understood that, within the scope of the appended claims, the invention may be practiced otherwise than as specifically described above.

COMPUTER APPENDIX

```
' Variables
Dim objFSO, WriteFile, dateStamp
' Grabbing datestamp
dateStamp = Date( ) & " " & Time( )
' Creating file object
Set objFSO = CreateObject("Scripting.FileSystemObject")
currentDirectory = left(WScript.ScriptFullName,(Len(WScript.ScriptFullName))–
(len(WScript.ScriptName)))
Set WriteFile = objFSO.CreateTextFile(currentDirectory & "\" & "enum_drives.txt", 8, True)
WriteFile.WriteLine(dateStamp)
WriteFile.WriteLine( )
' Physical drive info
WriteFile.WriteLine("Physical Drives")
WriteFile.WriteLine( )
strComputer = "."
Set objWMIService = GetObject("winmgmts:" & "{impersonationLevel=impersonate}!\\" &
strComputer & "\root\cimv2")
Set colDiskDrives = objWMIService.ExecQuery("Select * from Win32_DiskDrive")
For each objDiskDrive in colDiskDrives
    WriteFile.WriteLine("System Name: " & vbTab & objDiskDrive.SystemName)
    WriteFile.WriteLine("Bytes Per Sector: " & vbTab & objDiskDrive.BytesPerSector)
    For i = Lbound(objDiskDrive.Capabilities) to Ubound(objDiskDrive.Capabilities)
        WriteFile.WriteLine("Capabilities: " & vbTab & objDiskDrive.Capabilities(i))
    Next
    WriteFile.WriteLine("Caption: " & vbTab & objDiskDrive.Caption)
    WriteFile.WriteLine("Device ID: " & vbTab & objDiskDrive.DeviceID)
    WriteFile.WriteLine("Index: " & vbTab & objDiskDrive.Index)
    WriteFile.WriteLine("Interface Type: " & vbTab & objDiskDrive.InterfaceType)
    WriteFile.WriteLine("Manufacturer: " & vbTab & objDiskDrive.Manufacturer)
    WriteFile.WriteLine("Media Loaded: " & vbTab & objDiskDrive.MediaLoaded)
    WriteFile.WriteLine("Media Type: " & vbTab & objDiskDrive.MediaType)
    WriteFile.WriteLine("Model: " & vbTab & objDiskDrive.Model)
    WriteFile.WriteLine("Name: " & vbTab & objDiskDrive.Name)
    WriteFile.WriteLine("Partitions: " & vbTab & objDiskDrive.Partitions)
    WriteFile.WriteLine("PNP DeviceID: " & vbTab & objDiskDrive.PNPDeviceID)
    WriteFile.WriteLine("SCSI Bus: " & vbTab & objDiskDrive.SCSIBus)
    WriteFile.WriteLine("SCSI Logical Unit: " & vbTab & objDiskDrive.SCSILogicalUnit)
    WriteFile.WriteLine("SCSI Port: " & vbTab & objDiskDrive.SCSIPort)
    WriteFile.WriteLine("SCSI TargetId: " & vbTab & objDiskDrive.SCSITargetId)
    WriteFile.WriteLine("Sectors Per Track: " & vbTab & objDiskDrive.SectorsPerTrack)
    WriteFile.WriteLine("Signature: " & vbTab & objDiskDrive.Signature)
    WriteFile.WriteLine("Size: " & vbTab & objDiskDrive.Size)
    WriteFile.WriteLine("Status: " & vbTab & objDiskDrive.Status)
    WriteFile.WriteLine("Total Cylinders: " & vbTab & objDiskDrive.TotalCylinders)
    WriteFile.WriteLine("Total Heads: " & vbTab & objDiskDrive.TotalHeads)
    WriteFile.WriteLine("Total Sectors: " & vbTab & objDiskDrive.TotalSectors)
    WriteFile.WriteLine("Total Tracks: " & vbTab & objDiskDrive.TotalTracks)
    WriteFile.WriteLine("Tracks Per Cylinder: " & vbTab & objDiskDrive.TracksPerCylinder)
    WriteFile.WriteLine( )
```

COMPUTER APPENDIX

```
Next
WriteFile.WriteLine( )
'Logical Drive Info
WriteFile.WriteLine("Logical Drives")
WriteFile.WriteLine( )
Set objWMIService = GetObject("winmgmts:" & "{impersonationLevel=impersonate}!\\" &
strComputer & "\root\cimv2")
Set colDisks = objWMIService.ExecQuery ("Select * from Win32_LogicalDisk")
For each objDisk in colDisks
   WriteFile.WriteLine("Compressed: " & vbTab & objDisk.Compressed)
   WriteFile.WriteLine("Description: " & vbTab & objDisk.Description)
   WriteFile.WriteLine("DeviceID: " & vbTab & objDisk.DeviceID)
   WriteFile.WriteLine("DriveType: " & vbTab & objDisk.DriveType)
   WriteFile.WriteLine("FileSystem: " & vbTab & objDisk.FileSystem)
   WriteFile.WriteLine("FreeSpace: " & vbTab & objDisk.FreeSpace)
   WriteFile.WriteLine("MediaType: " & vbTab & objDisk.MediaType)
   WriteFile.WriteLine("Name: " & vbTab & objDisk.Name)
   WriteFile.WriteLine("QuotasDisabled: " & vbTab & objDisk.QuotasDisabled)
   WriteFile.WriteLine("QuotasIncomplete: " & vbTab & objDisk.QuotasIncomplete)
   WriteFile.WriteLine("QuotasRebuilding: " & vbTab & objDisk.QuotasRebuilding)
   WriteFile.WriteLine("Size: " & vbTab & objDisk.Size)
   WriteFile.WriteLine("SupportsDiskQuotas: " & vbTab & objDisk.SupportsDiskQuotas)
   WriteFile.WriteLine("SupportsFileBasedCompression: " & vbTab &
objDisk.SupportsFileBasedCompression)
   WriteFile.WriteLine("SystemName: " & vbTab & objDisk.SystemName)
   WriteFile.WriteLine("VolumeDirty: " & vbTab & objDisk.VolumeDirty)
   WriteFile.WriteLine("VolumeName: " & vbTab & objDisk.VolumeName)
   WriteFile.WriteLine("VolumeSerialNumber: " & vbTab & objDisk.VolumeSerialNumber)
   WriteFile.WriteLine( )
Next
Wscript.Echo "Tristan Audit is Complete"
1/28/2010 10:42:56 AM
enum_drives
Physical Drives
System Name:          WSSHIR71381
Bytes Per Sector:     512
Capabilities:    3
Capabilities:    4
Caption:         WDC WD800BJKT-75F4T0
Device ID:       \\.\PHYSICALDRIVE0
Index: 0
Interface Type:       IDE
Manufacturer:    (Standard disk drives)
Media Loaded:         True
Media Type:      Fixed hard disk media
Model:           WDC WD800BJKT-75F4T0
Name: \\.\PHYSICALDRIVE0
Partitions:      2
PNP DeviceID:         IDE\DISKWDC_WD800BJKT-
75F4T0_____11.01A11\5&2DE4FDB&0&0.0.0
SCSI Bus:        0
SCSI Logical Unit:    0
SCSI Port:       0
SCSI TargetId:        0
Sectors Per Track:    63
Signature:       −1343051057
Size:    80023749120
Status: OK
Total Cylinders:      9729
Total Heads:     255
Total Sectors:   156296385
Total Tracks:    2480895
Tracks Per Cylinder:  255
System Name:          WSSHIR71381
Bytes Per Sector:     512
Capabilities:    3
Capabilities:    4
Capabilities:    7
Caption:         SanDisk U3 Cruzer Micro USB Device
Device ID:       \\.\PHYSICALDRIVE1
Index: 1
Interface Type:       USB
Manufacturer:    (Standard disk drives)
Media Loaded:         True
Media Type:      Removable media other than floppy
Model:           SanDisk U3 Cruzer Micro USB Device
Name: \\.\PHYSICALDRIVE1
```

-continued

| COMPUTER APPENDIX |
|---|

Partitions: 1
PNP DeviceID:
    USBSTOR\DISK&VEN_SANDISK&PROD_U3_CRUZER_MICRO&REV_3.27\00001
60EF17328C7&0
SCSI Bus:
SCSI Logical Unit:
SCSI Port:
SCSI TargetId:
Sectors Per Track: 63
Signature: −1215830468
Size: 2048094720
Status: OK
Total Cylinders: 249
Total Heads: 255
Total Sectors: 4000185
Total Tracks: 63495
Tracks Per Cylinder: 255
Logical Drives
Compressed: False
Description: Local Fixed Disk
DeviceID: C:
DriveType: 3
FileSystem: NTFS
FreeSpace: 34301472768
MediaType: 12
Name: C:
QuotasDisabled: True
QuotasIncomplete: True
QuotasRebuilding: False
Size: 79957946368
SupportsDiskQuotas: True
SupportsFileBasedCompression: True
SystemName: WSSHIR71381
VolumeDirty: False
VolumeName:
VolumeSerialNumber: 8CB60856
Compressed:
Description: CD-ROM Disc
DeviceID: D:
DriveType: 5
FileSystem:
FreeSpace:
MediaType: 11
Name: D:
QuotasDisabled:
QuotasIncomplete:
QuotasRebuilding:
Size:
SupportsDiskQuotas:
SupportsFileBasedCompression:
SystemName: WSSHIR71381
VolumeDirty:
VolumeName:
VolumeSerialNumber:
Compressed: False
Description: Removable Disk
DeviceID: E:
DriveType: 2
FileSystem: FAT
FreeSpace: 1054179328
MediaType:
Name: E:
QuotasDisabled:
QuotasIncomplete:
QuotasRebuilding:
Size: 2054717440
SupportsDiskQuotas: False
SupportsFileBasedCompression: False
SystemName: WSSHIR71381
VolumeDirty: True
VolumeName: UHY-SHIRK
VolumeSerialNumber: 444D01D5
Compressed:
Description: Network Connection
DeviceID: F:
DriveType: 4
FileSystem:

-continued

| COMPUTER APPENDIX |
|---|

FreeSpace:
MediaType: 0
Name: F:
QuotasDisabled:
QuotasIncomplete:
QuotasRebuilding:
Size:
SupportsDiskQuotas:
SupportsFileBasedCompression:
SystemName: WSSHIR71381
VolumeDirty:
VolumeName:
VolumeSerialNumber:
Compressed:
Description: Network Connection
DeviceID: O:
DriveType: 4
FileSystem:
FreeSpace:
MediaType: 0
Name: O:
QuotasDisabled:
QuotasIncomplete:
QuotasRebuilding:
Size:
SupportsDiskQuotas:
SupportsFileBasedCompression:
SystemName: WSSHIR71381
VolumeDirty:
VolumeName:
VolumeSerialNumber:
Compressed:
Description: Network Connection
DeviceID: S:
DriveType: 4
FileSystem:
FreeSpace:
MediaType: 0
Name: S:
QuotasDisabled:
QuotasIncomplete:
QuotasRebuilding:
Size:
SupportsDiskQuotas:
SupportsFileBasedCompression:
SystemName: WSSHIR71381
VolumeDirty:
VolumeName:
VolumeSerialNumber:
Compressed:
Description: Network Connection
DeviceID: T:
DriveType: 4
FileSystem:
FreeSpace:
MediaType: 0
Name: T:
QuotasDisabled:
QuotasIncomplete:
QuotasRebuilding:
Size:
SupportsDiskQuotas:
SupportsFileBasedCompression:
SystemName: WSSHIR71381
VolumeDirty:
VolumeName:
VolumeSerialNumber:

I claim:

1. A method for collecting electronically stored information of one or more source files including available deleted files stored on an internal persistent storage device in a target computer, the method comprising the steps of:

connecting an external persistent memory storage device to a target computer having an internal persistent storage device for storing an image of one or more source files including available deleted files;

loading a software application tool resident on the external persistent memory storage device into the memory of a target computer, said software application tool including instructions for causing said target computer to copy said one or more source files and available deleted files stored on said internal persistent storage device in target computer and create an image of said one or more source files and deleted files on said external persistent memory storage device defining one or more image files, wherein said image is created without changing any data or associated meta data stored on the source file;

verifying that said image file is an exact copy of said one or more source files and available deleted files by way of said software application tool comprising the steps;

determining a hash value of said one or more source files and available deleted files;

determining a hash value of said one or more image files;

comparing the hash value of said one or more source files including available deleted files with said hash value of said one or more image files;

based upon the comparison, determining that said one or more image files are an exact copy of said one or more source files and available deleted files;

after said image file is stored on said external persistent memory storage device, disconnecting said external persistent memory storage device from said target computer;

securing said external persistent memory storage device with said image file from said target computer stored thereon in a sealable secure container for receiving the external persistent memory storage device, configured to protect the external persistent memory storage device from electrostatic discharge and to indicate if the container has been tampered with after it has been sealed.

2. The method as recited in claim 1 further comprising:
displaying an instruction to create a disk image.

3. The method as recited in claim 1, wherein said software application tool is configured to copy said one or more source files in different file formats includes the steps:

displaying different selectable file formats on the display of the target computer; and determining which of the file formats was selected;

copying said one or more source files onto said external persistent memory storage device in a file format selected by the user.

4. The method as recited in claim 3, wherein step comprises:

displaying Raw, Smart and E01 file formats on the display of the target computer, wherein said file formats are selectable; and storing said one or more image files in the selected formats.

5. The method as recited in claim 1, further including the step of identifying any partitions in said internal persistent storage device in said target computer from which said one or more image files and available deleted files were obtained and store identifications for said partitions along with said one or more image files under the control of said software application tool.

6. The method as recited in claim 5, further including the step of identifying all of the partitions on the internal persistent storage device in the target computer to determine if the image file contains images from all partitions under the control of said software application tool.

7. A method for collecting electronically stored information of one or more source files including available deleted files stored on an internal persistent storage device associated with a target computer, the method comprising the steps of:

connecting an external persistent memory storage device to a target computer for storing one or more images of said one or more source files and available deleted files stored on said internal persistent storage device in said target computer;

copying said one or more source files and available deleted files stored on said target computer and creating one or more image files of said one or more source files and deleted files on said external persistent memory storage device wherein said one or more image files are created without changing any data or associated meta data stored on the source file;

verifying if said one or more image files are an exact copy of said one or more source files and available deleted files comprising the steps;

determining a hash value of said one or more source files;

determining a hash value of said one or more image files;

comparing the hash value of said one or more source files with said hash value of said one or more image files;

based upon the comparison, determining that said one or more image files are an exact copy of said one or more source files; and storing the results of step (c) in said external persistent memory storage device;

after said image file is stored on said external persistent memory storage device, disconnecting said external persistent memory storage device from said target computer; and securing said external persistent memory storage device with said image file from said target computer stored thereon in a sealable secure container for receiving the external persistent memory storage device, configured to protect the external persistent memory storage device from electrostatic discharge and to indicate if the container has been tampered with after it has been sealed.

8. The method as recited in claim 7, further comprising:
determining the partitions in the said internal persistent memory storage device in the target computer to determine if said one or more image files include images of all of the partitions in the target computer.

9. The method as recited in claim 7, further comprising:
storing the identification of the partition for the one or more imaged files and deleted files.

10. The method as recited in claim 7, further comprising:
executing a software application tool resident on the external persistent memory storage device on the target computer, said software application tool including instructions for causing said target computer to copy one or more source files and deleted files stored in said internal persistent storage device in said target computer and create one or more image files of said one or more source files and deleted files on said external persistent memory storage device.

11. The method as recited in claim 7, further including the step of:
storing the image file in one of a plurality of selectable formats on said external memory storage device.

* * * * *